Sept. 27, 1932.   J. C. SCHULTE   1,879,542
FARM GATE
Filed Nov. 7, 1931   2 Sheets-Sheet 2
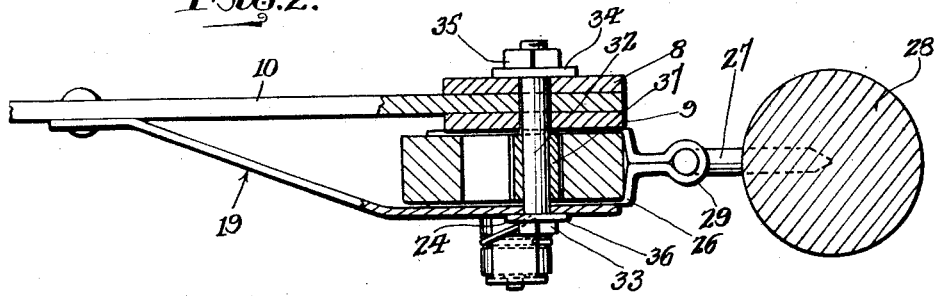
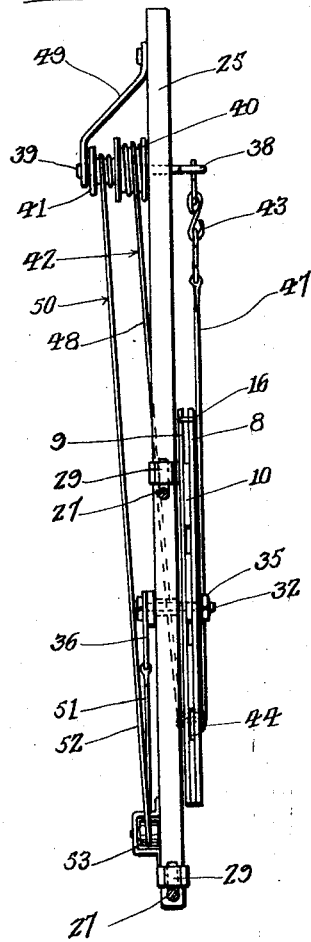
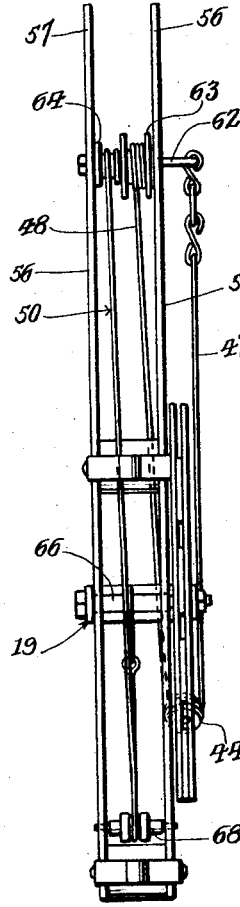
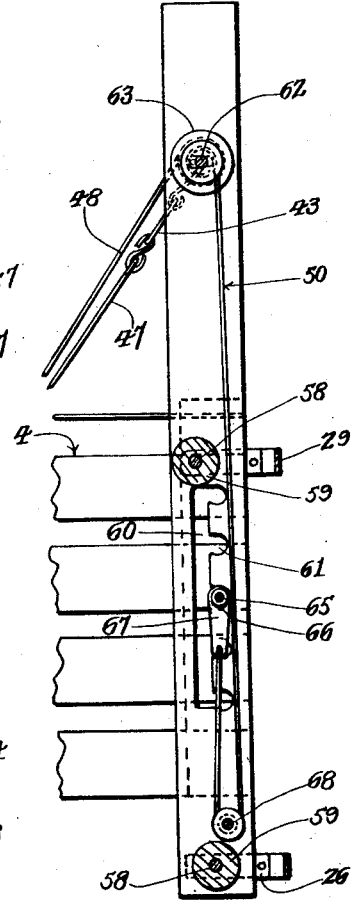
Inventor
John C. Schulte
By Geo. P. Kimmel
Attorney Patented Sept. 27, 1932

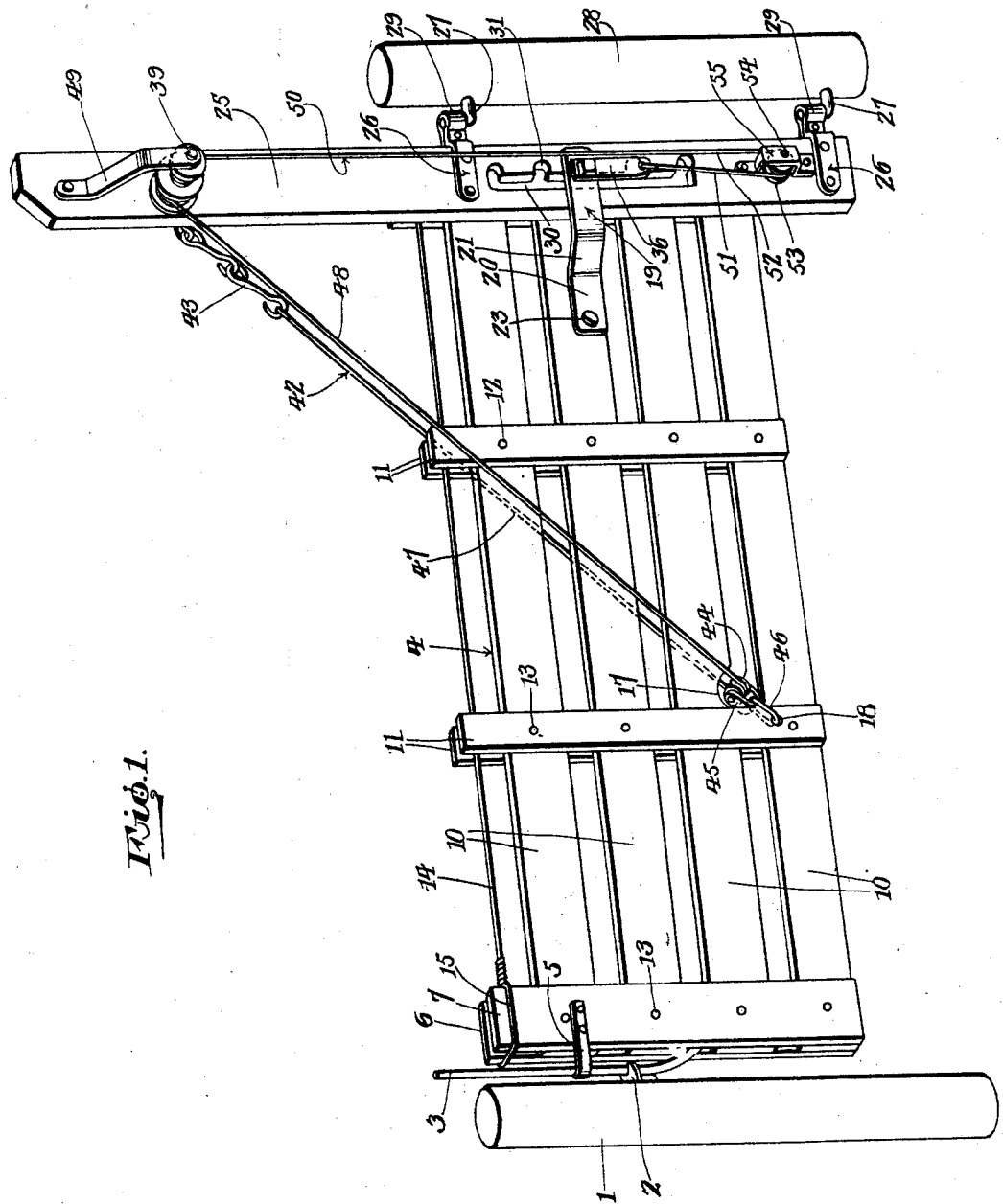

1,879,542

UNITED STATES PATENT OFFICE

JOHN C. SCHULTE, OF NORWAY, IOWA

FARM GATE

Application filed November 7, 1931. Serial No. 573,677.

My invention relates to farm gates and is an improvement upon the construction of gate as disclosed in Letters Patent 1,620,786 granted to me March 15, 1927.

The essential objects of my invention are to insure for the suspension of long or short hinged gates used for fields and lanes in a non-sagging position whereby the gate is maintained permanently at right angles to that post to which it is hinged; to provide for the vertical adjustment of the gate body to various distances above the ground level and to automatically prevent the non-sagging of such body when adjusted; to enable the gate body to be tilted upwardly when desired; to enable the gate to be readily moved upwardly to the desired height and supported in a non-sagging position when that post with which the gate body is hinged sinks or sags; to provide for automatically levelling the gate body when occasion requires; and to attain these ends in a strong, durable, compact and comparatively inexpensive structure.

To the above ends and others which may hereinafter appear my invention consists of such parts and such combination of parts which fall within the scope of the invention as claimed.

In the drawings:

Figure 1 is a perspective view of a gate in accordance with my invention.

Figure 2 is a fragmentary view of the gate in sectional plan.

Figure 3 is a view looking towards the hinged end of the gate body.

Figure 4 is a view looking towards the outer edge of a modified form of hinged carrier for the hinged end of the gate body and with the latter coupled to the carrier.

Figure 5 is a fragmentary view of the gate body coupled to the modified form of carrier and with the latter shown in vertical section.

Referring to the drawings, 1 denotes a post anchored in the ground and carrying a keeper 2 for the reception of a resilient latching member 3 extended from one end of the gate body 4. A stop 5 is secured to said end of gate body 4 for arresting the outward shift of member 3. The body 4 can be set up from any suitable material.

The gate body 4 is of skeleton form and includes vertically disposed end members. The end members are arranged in pairs. Two pairs of end members are employed. The end members of one pair being spaced from and opposing the end members of the other pair. The end members of each pair are arranged in opposed spaced relation. The end members of one pair are indicated at 6, 7 and the end members of the other pair are designated 8, 9. The end member 6 opposes in sidewise relation the end member 8. The end member 7 opposes in sidewise relation the end member 9. Extending from and between end members 6, 7 to and between the members 8, 9 is a set of horizontally disposed, spaced, superposed body members 10. The upper one of the members 10 has its top edge arranged below the top edges of members 6, 7, 8 and 9, and the lower one of the members 10 has its bottom edge flush with the bottom edge of members 6, 7, 8 and 9.

The gate body 4 also includes a plurality of spaced pairs of braces and coupling members which are vertically disposed and of the same height as the end members. The brace members of each pair are arranged in parallel spaced relation. The brace members of each pair are indicated at 11. The body members 10 extend between each pair of brace members and are secured to the latter by holdfast means 12. The body members 10 are also secured to the end members by holdfast means 13. Above the upper one of the members 10 there is arranged a wire tie 14 between the pairs of end members. The tie 14 is formed at its ends with the loops 15, 16, the former encompassing the upper end of members 6, 7 and the latter the upper ends of members 8, 9. The tie extends between the upper ends of the pairs of brace members. That body member 10 arranged over the lower one of the body members is cut away in its bottom edge to provide a semi-circular recess 17 to constitute a clearance for a purpose to be referred to. The recess 17 is positioned in proximity to a pair of brace members 11 and the latter have openings 18 which register with an opening formed in the lower one of the body members 10. Secured to that body member 10 which is arranged directly above the body member formed with recess 17 and in proximity to one end thereof is a coupling bracket 19 formed with an inner part 20, and outwardly directly inclined intermediate part 21 and an outer part 22. The parts 20 and 22 are disposed in parallel spaced planes. A holdfast means 23 secures part 20 to the body member 10. The part 22 is formed with an opening 24. The free end edge of part 22 is flush with the outer side edges of members 8, 9. The parts 22 opposes in spaced relation the member 9.

The gate includes a hinged carrier comprising a standard 25 of materially greater height than the end members of gate body 4 and which opposes end member 9. Fixedly secured to standard 25 is a pair of spaced, superposed hinges 26 which are supported by and swing upon angle shaped hooks 27 secured in and extending from a post 28 anchored in the ground and spaced from standard 25. The hinges 26 include loops 29 which oppose and are spaced from the outer side edge of standard 25. The hooks 27 extend upwardly through loops 25 and the bottoms of the latter are supported by the hooks 27.

The standard 25 has a lengthwise extending slot 30 at its longitudinal median and a set of spaced superposed notches 31 arranged at right angles to and opening into slot 30 through the outer side wall of the latter. The walls of the notches 31 provide seats for a purpose to be presently referred to.

Extending through the end members 8, 9, that body member 10 to which bracket 19 is attached, slot 30 and opening 24 is a supporting bolt 32 having a head indicated at 33. A washer 34 abuts end member 8 and a securing nut 35 is carried by bolt 32 and opposes washer 34. The head 33 is arranged adjacent to the outer face of part 22 of bracket 19. Carried by bolt 32 and interposed between head 33 and part 22 is a coupling piece 36. Mounted on bolt 32 and arranged between end member 9 and part 22 is a roller 37 which is positioned in standard 25 and normally seated in a notch 31. The bracket 19, bolt 32, washer 34, nut 35 and roller 37 provides a vertically and horizontally adjustable combined pivoting, supporting and connecting means or a coupling means for connecting the gate body to the carrier, the latter being provided by standard 25. The gate body 4 is vertically adjustable relative to standard 25 by moving the bolt 32 upwardly or downwardly in slot 30 and when the desired position for the gate body 4 has been reached roller 37 is seated within and coacts with the wall of a notch for supporting that end of the gate body 4 which opposes standard 25.

Projecting from one side of standard 25 is an eye bolt 38 and from its other is a shaft 39 carrying a pair of revoluble spools 40, 41 secured together to provide for the revolving thereof in unison. The spool 40 is of greater diameter than spool 41. Winding on and off the spool 40 is a lengthwise adjustable flexible, inclined holding element 42 consisting of a cable bent upon itself to provide a split loop having one end attached to spool 40 and its other secured to a coupler 43 attached to the eye bolt 38. The bend in the cable travels over a pulley 44 carried by a yoke 45 connected by a link 46 which extends through opening 18. The yoke 45 is arranged in recess 17. The stretches 47 and 48 of the cable are arranged on opposite sides of the gate body. The element 42 extends upwardly at an inclination from the pulley 44 to the eye bolt 38 and drum 40. Secured to the standard 25 is an offset, depending supporting bracket 49 having its lower end formed with an opening through which extends the outer end of shaft 39.

Attached to the lower end of coupler piece 36 is one end of an operating element 50 acting to revolve the spools to shorten the loop formed by element 42 when the gate body 4 is elevated and to prevent the revolving of the spools when the gate body 4 is mounted in adjusted position. When the gate body 4 is elevated the element 50 winds off spool 41 and stretch 48 winds on spool 40. When the gate body 4 is lowered stretch 48 winds off spool 40 and element 50 winds on spool 41. The winding off of stretch 48 operates the spools in an anti-clockwise direction. The winding off of element 50 operates the spools in a clockwise direction. The element 50 is in the form of a cable bent upon itself to provide a pair of vertical stretches 51 and 52 and the bend travels around a pulley 53 mounted on a shaft 54 supported by the lower end of standard 25 and a bracket 55. The stretch 52 has its upper end attached to spool 41. The stretch 51 has its upper end attached to coupler piece 36. The elements 42 and 50 coact to prevent the gate body from sagging, that is to say maintaining it level when in any of its adjusted positions. The action of elements 42 and 50 being automatic.

Spools 40 and 41 are so fastened together that they turn on the pivot as a unit. The flexible element 42 winds on and off spool 40 and the flexible element 50 winds on and off the smaller spool 41. The winding on and off occurs as the adjustment of the gate is raised or lowered. When the gate is raised element 50 winds off of spool 41 and element 42 winds on to spool 40. When the gate is lowered element 50 winds on to spool 41, the smaller, and element 42 winds off of spool 40. However, element 50 in the winding and unwinding process travels in a vertical direction while element 42 in the winding and unwinding process travels in a diagonal direction at approximately 45°, and consequently a greater amount of element 42 must be wound on spool 40 than there is of element 50 to be unwound from spool 41 for the same number of revolutions of the two spools 40 and 41, and consequently in order for spool 40 to take up or release more of the cable winding on and off of it than is wound up or released by spool 41, spool 40 has to be of a larger diameter.

Referring to Figures 4 and 5, there is shown a modified form of hinged carrier in the form of a standard consisting of a pair of opposed, spaced parallel sections 56. 57 connected together by bolts 58 carrying spacer collars or sleeves 59 interposed between sections 56, 57. Each section is slotted, as at 60 and also formed with superposed spaced notches 61 which open into slot 60. The slot and notched arrangement of each section corresponds to that of standard 25. The slot and notches of one section align with that of the other section.

Extending through the sections in proximity to the upper ends thereof is an eye bolt 62 which functions as a shaft for a pair of spools 63, 64 corresponding to and for the same purpose as the spools 40, 41 respectively. The spools 63, 64 are arranged between sections 56, 57. The coupler 43 is attached to eye bolt 62. The gate body 4 is connected to the sections 56, 57 of the standard by a bolt 65 in the same manner as bolt 32 connects standard 25 to the gate body. Mounted on bolt 65 and arranged between sections 56, 57 is a pair of rollers 66 performing with respect to notches 61 the same function as roller 37 with respect to notches 31. Mounted on bolt 65 and between rollers 66 is a depending coupler piece 67 performing the same function as coupler piece 36. Journaled in the sections 56, 57, near the lower end thereof is a grooved roller 68 performing the same function as roller 53. Otherwise than that as stated the form shown in Figures 4 and 5 is the same and functions in a like manner, as that shown in Figures 1 to 3, with this further exception, that the element 50 is arranged between and the stretch of element 42 extends between the sections 56, 57 of the standard.

What I claim is:—

1. The combination with a gate, of a vertically disposed hinged carrier, a combined pivoting, supporting and connecting means for the gate extending through the gate and carrier for connecting one end of the gate to the carrier, said carrier being slotted for the vertical adjustment bodily of said means and gate relative to the carrier, one of the walls of said slot having superposed notches coacting with said means for supporting the latter in its adjusted position, and flexible elements attached to the carrier and to said means, slidably connected to said gate at a point remote from the carrier and automatically and simultaneously winding off and on the carrier for maintaining the gate in a level position.

2. The combination with a gate, of a vertically disposed hinged carrier, means for suspending the carrier above the ground level, means for adjustably connecting one end of the gate to the carrier, said carrier having means to provide for the vertical adjustment of said connecting means and superposed spaced selective supports for and upon which said connecting means may pivot, a pair of simultaneously and automatically revoluble spools supported from the carrier, a flexible element having one end attached to the carrier and its other end attached to and for winding on and off one of said spools, means for slidably connecting said element to the gate, a flexible element having one end attached to said adjustable connecting means and its other end attached to and for winding on and off the other of said spools, and means for slidably connecting the second mentioned element to the carrier.

3. The combination with a gate, of a carrier, of a vertically and horizontally adjustable means for connecting one end of the gate to the carrier, a pair of flexible elements, each bent upon itself, means for connecting one end of one of said elements to the carrier, means for slidably connecting such element to the gate body, means for connecting one end of the other of said elements to said adjustable connecting means, means for slidably connecting the said other element to said carrier, means supported from the carrier and having the other ends of said elements connected thereto for simultaneously and alternately winding and unwinding said elements with respect to each other to maintain the gate level, and said carrier having means to permit of the vertical and horizontal adjustment of said adjustable connecting means.

4. The combination with a gate, of a hinged carrier, a vertically and horizontally adjustable means for connecting one end of the gate with said carrier, said carrier having means to permit of the vertical and horizontal adjustment of said adjustable connecting means, a flexible suspension element for the gate slidably connected thereto and extended from the carrier, a flexible holding element for said suspension element attached at one end to and extended from said adjustable connecting means, said suspension element having one end attached to the carrier, means for slidably connecting said holding element to the carrier, and means common to the other end of said suspension element and other end of the holding element and supported from the carrier for automatically decreasing the extended length of one of said elements simultaneously with increasing the extended length of the other of said elements.

In testimony whereof, I affix my signature hereto.

JOHN C. SCHULTE.